United States Patent
Kim

(10) Patent No.: US 10,369,970 B2
(45) Date of Patent: Aug. 6, 2019

(54) WIPER BLADE ASSEMBLY

(71) Applicant: CAP Corporation, Sangju-si, Gyeongsangbuk-do (KR)

(72) Inventor: Myoung Yeon Kim, Ulsan (KR)

(73) Assignee: CAP CORPORATION (KR)

( * ) Notice: Subject to any disclaimer, the term of this patent is extended or adjusted under 35 U.S.C. 154(b) by 168 days.

(21) Appl. No.: 15/508,644

(22) PCT Filed: Aug. 28, 2015

(86) PCT No.: PCT/KR2015/009070
§ 371 (c)(1),
(2) Date: Mar. 3, 2017

(87) PCT Pub. No.: WO2016/036068
PCT Pub. Date: Mar. 10, 2016

(65) Prior Publication Data
US 2017/0282863 A1    Oct. 5, 2017

(30) Foreign Application Priority Data

Sep. 5, 2014   (KR) .................. 10-2014-0119104

(51) Int. Cl.
*B60S 1/38*    (2006.01)
*B60S 1/40*    (2006.01)

(52) U.S. Cl.
CPC .................. *B60S 1/40* (2013.01); *B60S 1/381* (2013.01); *B60S 1/387* (2013.01); *B60S 1/3851* (2013.01);
(Continued)

(58) Field of Classification Search
CPC ...... B60S 1/3808; B60S 1/381; B60S 1/3851; B60S 1/3853; B60S 1/3858; B60S 1/3881;
(Continued)

(56) References Cited

U.S. PATENT DOCUMENTS 7,350,259 B2   4/2008   Walworth
8,689,389 B2   4/2014   Kim et al.
(Continued)

FOREIGN PATENT DOCUMENTS

FR          2925437      *  6/2009
KR    2010-0125347 A       11/2010
(Continued)

OTHER PUBLICATIONS

International Search Report PCT/ISA/210 for International Application No. PCT/KR2015/009070 dated Nov. 23, 2015.
(Continued)

*Primary Examiner* — Gary K. Graham
(74) *Attorney, Agent, or Firm* — Grossman, Tucker, Perreault & Pfleger, PLLC

(57) ABSTRACT

The present invention relates to a wiper blade assembly, comprising: a refill member; an elastic member supporting the refill member; a cover member into which the elastic member is inserted, including an engagement cover fastener; and an engagement cover which is fastened to the engagement cover fastener, wherein a first side of the engagement cover includes a cover member receiving part for receiving the cover member, and wherein the wiper blade assembly includes a fastening protrusion located in a certain area of the cover member receiving part. Because the refill member and the cover member can be produced by a single extrusion molding process, it is possible to reduce the number of manufacturing processes.

7 Claims, 6 Drawing Sheets

(52) U.S. Cl.
CPC ............ *B60S 1/3853* (2013.01); *B60S 1/3858* (2013.01); *B60S 1/3867* (2013.01); *B60S 2001/3843* (2013.01)

(58) Field of Classification Search
CPC ........ B60S 1/3863; B60S 1/40; B60S 1/4003; B60S 2001/3843; B60S 1/3867
USPC ........................................ 15/250.201, 250.43
See application file for complete search history.

(56) References Cited

U.S. PATENT DOCUMENTS

| | | | |
|---|---|---|---|
| 9,096,195 B2 | 8/2015 | Boland | |
| 9,120,463 B2 | 9/2015 | Kim et al. | |
| 9,522,653 B2* | 12/2016 | Song | B60S 1/3853 |
| 9,701,283 B2* | 7/2017 | Lee | B60S 1/3851 |
| 2007/0113366 A1* | 5/2007 | Walworth | B60S 1/3856 |
| | | | 15/250.32 |
| 2009/0056049 A1* | 3/2009 | Jarasson | B60S 1/381 |
| | | | 15/250.32 |
| 2010/0293737 A1* | 11/2010 | Ollier | B60S 1/3858 |
| | | | 15/250.34 |
| 2011/0047742 A1* | 3/2011 | Kim | B60S 1/3858 |
| | | | 15/250.32 |
| 2011/0113581 A1 | 5/2011 | Boland | |
| 2012/0233802 A1* | 9/2012 | Depondt | B60S 1/387 |
| | | | 15/250.33 |
| 2013/0152330 A1 | 6/2013 | Kim et al. | |
| 2013/0192016 A1 | 8/2013 | Kim et al. | |
| 2013/0263401 A1* | 10/2013 | Bex | B60S 1/3856 |
| | | | 15/250.48 |
| 2014/0137360 A1* | 5/2014 | Bex | B60S 1/3853 |
| | | | 15/250.201 |

FOREIGN PATENT DOCUMENTS

| | | |
|---|---|---|
| KR | 2011-0112793 A | 10/2011 |
| KR | 10-1201547 B1 | 11/2012 |
| KR | 10-1350277 B1 | 1/2014 |

OTHER PUBLICATIONS

Written Opinion of the International Searching Authority PCT/ISA/237 for International Application No. PCT/KR2015/009070 dated Nov. 23, 2015.

* cited by examiner

【Fig. 1】
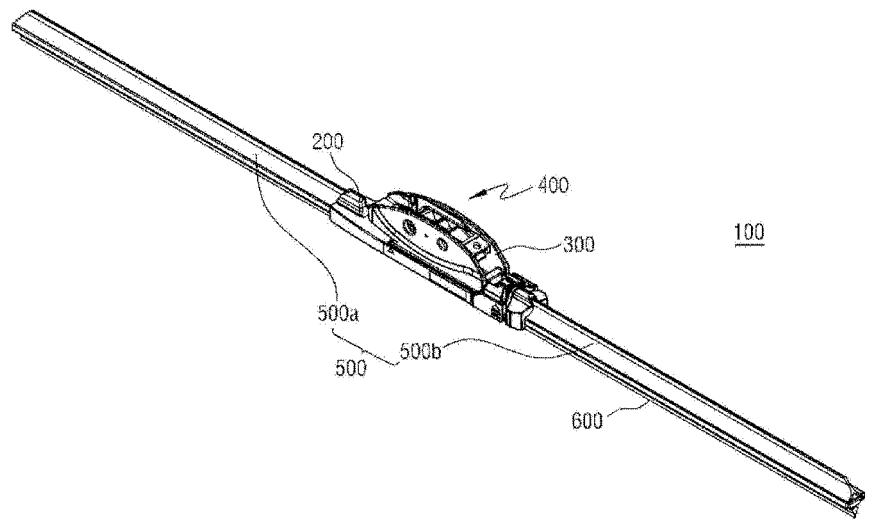
【Fig. 2】
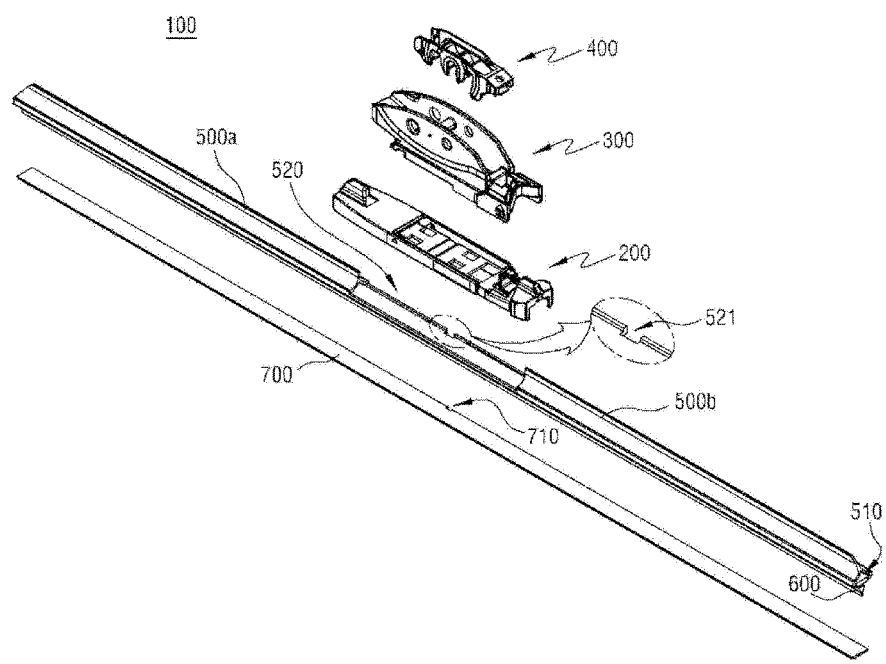

【Fig. 3】
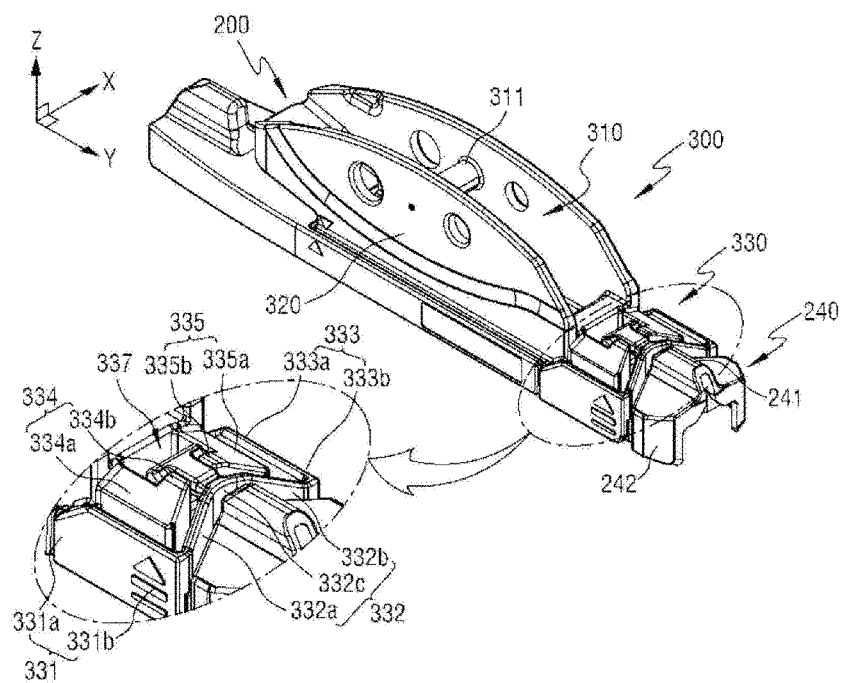
【Fig. 4】
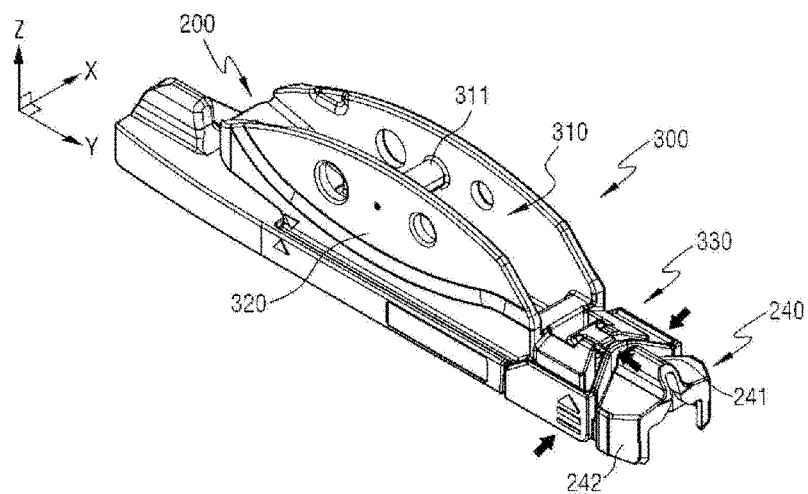

[Fig. 5]
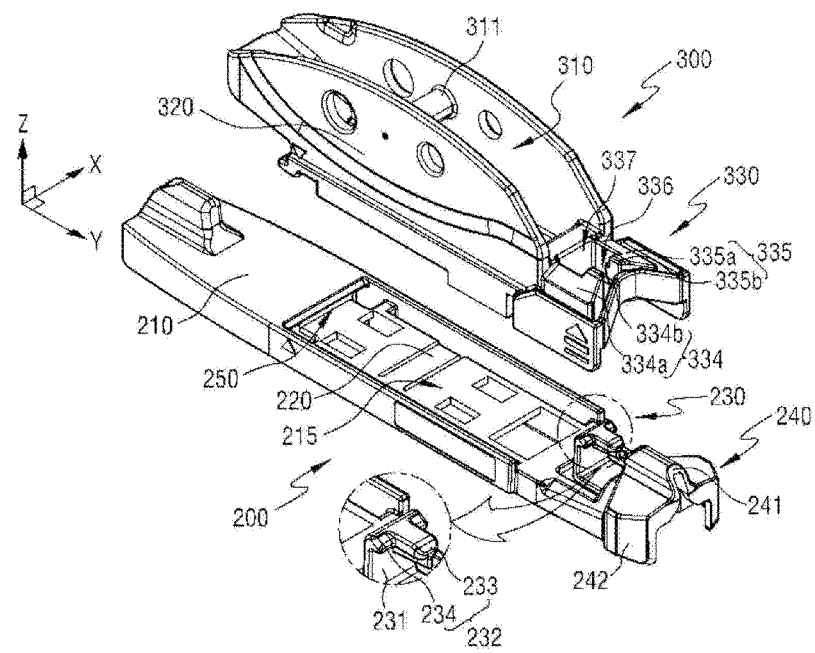
[Fig. 6]
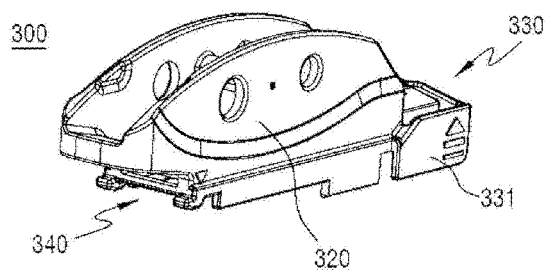

【Fig. 7】
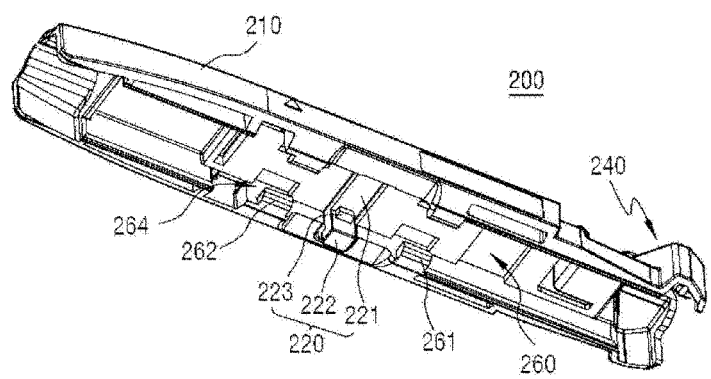
【Fig. 8】
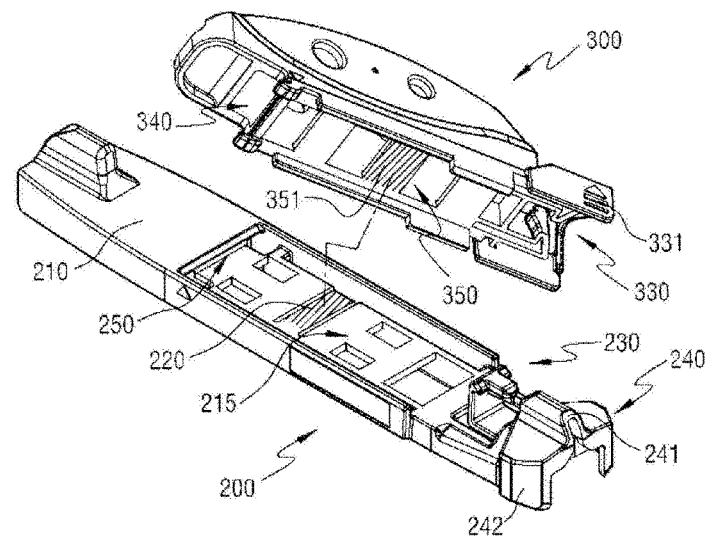

[Fig. 9]
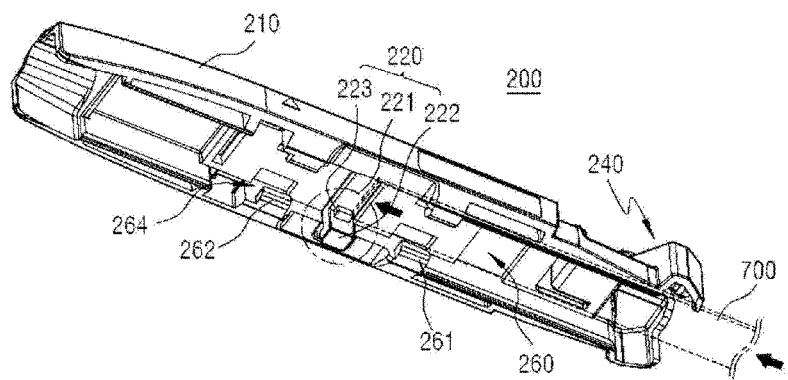
[Fig. 10]
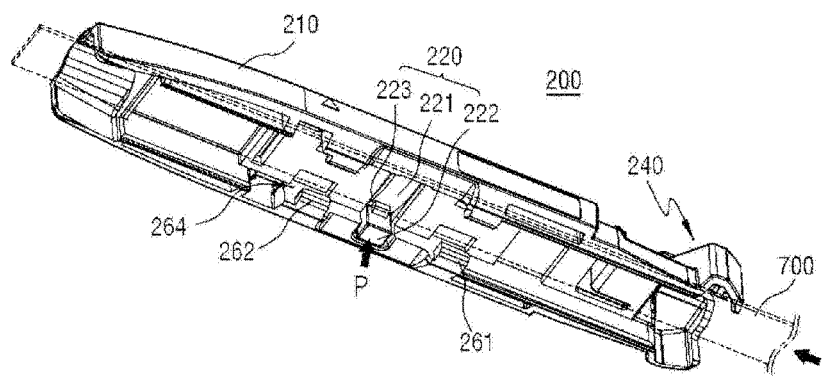
[Fig. 11]
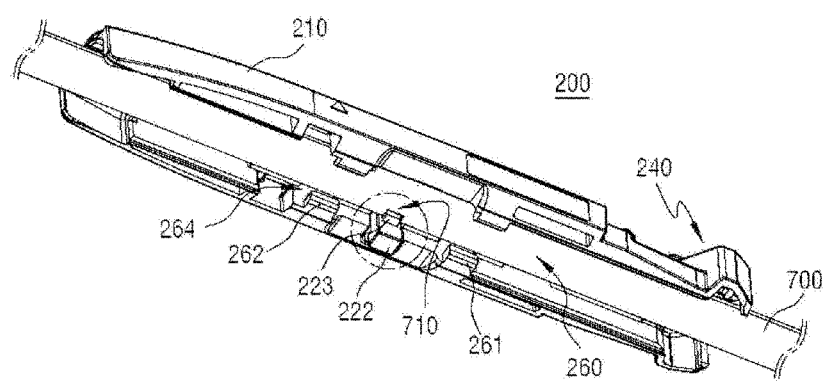

[Fig. 12]
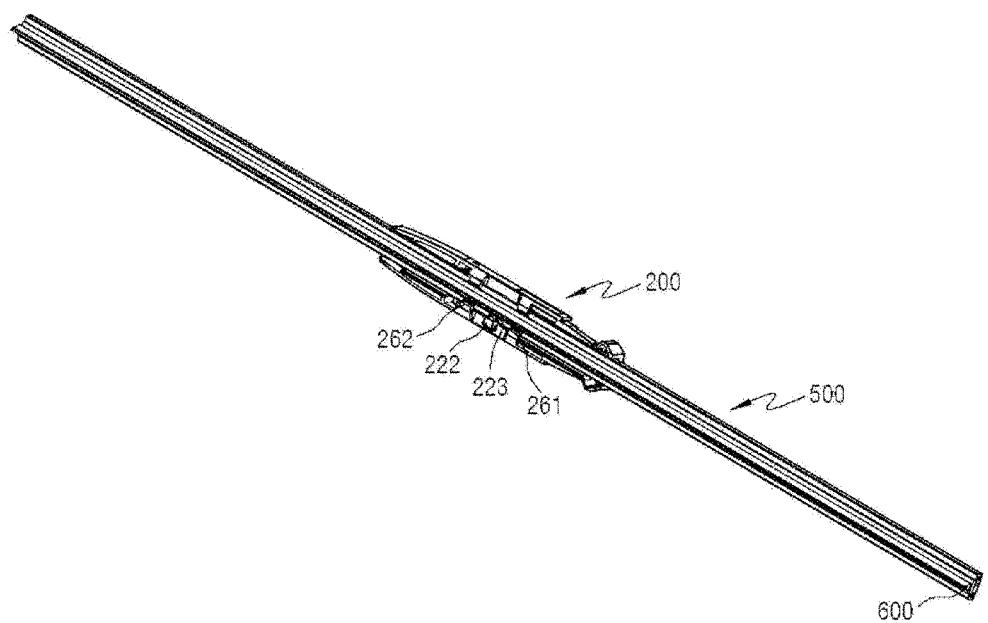

WIPER BLADE ASSEMBLY

CROSS-REFERENCE TO RELATED APPLICATIONS

This application is a national phase under 35 U.S.C. § 371 of PCT International Application No. PCT/KR2015/009070 which has an International filing date of Aug. 28, 2015, which claims priority to Korean Application No. 10-2014-0119104, filed Sep. 5, 2014, the entire contents of each of which are hereby incorporated by reference.

TECHNICAL FIELD

The invention relates to a wiper blade assembly, and more particularly, to a wiper blade assembly capable of facilitating the separation of an engagement cover and an adapter.

BACKGROUND ART

A wiper blade assembly for wiping away rain, in the case of rain, or removing foreign materials to secure a driver's visual field is disposed in a wind shield of a vehicle. The wiper blade assembly is connected to a wiper arm connected to a driving shaft connected to a wiper driving motor of the vehicle to be driven.

Here, the wiper arm and the wiper blade assembly are connected to each other through a wiper connector. In general, the wiper blade assembly includes a clamp, to which a connector member is coupled, and the wiper arm is coupled to the connector member in a state in which the connector member is coupled to the clamp.

Meanwhile, the wiper blade assembly may be classified into a conventional type or a flat type according to the structure of a blade.

A typical wiper blade assembly includes a refill member, which removes any foreign materials attached on a wind shield, an elastic member, which supports the refill member, and a cover member, which covers the elastic member and extends along a longitudinal direction of the elastic member.

The typical wiper blade assembly further includes an engagement cover, which is coupled to the elastic member, and the engagement cover may have a structure that can be coupled to an adapter.

For example, Korean Patent No. 1201547 discloses a wiper blade assembly, and FIG. 1 of the Korean Patent shows a refill member, which removes any foreign materials attached on a wind shield, an elastic member, which supports the refill member, and a cover member, which has a first end covering the end of the elastic member and extends along a longitudinal direction of the elastic member.

According to the Korean Patent, the refill member and the cover member are formed by separate processes, the refill member is coupled to the elastic member, and the cover member extends, and is coupled, along the longitudinal direction of the elastic member, while covering the elastic member.

This type of conventional wiper blade assembly, however, requires the refill member and the cover member to be fabricated by separate processes and thus results in increases in the number of manufacturing processes and manufacturing cost.

DISCLOSURE

Technical Problems

To address the aforementioned problems, exemplary embodiments of the present invention provide a wide blade assembly capable of reducing the number of manufacturing processes by fabricating a refill member and a cover member through a single process.

Additional advantages, subjects, and features of the present invention will be set forth in part in the description which follows and in part will become apparent to those having ordinary skill in the art upon examination of the following or may be learned from practice of the present invention.

Technical Solutions

According to an aspect of the present invention, a wiper blade assembly includes: a refill member; an elastic member which supports the refill member; a cover member into which the elastic member is inserted, the cover member including an engagement cover fastening part; and an engagement cover which is coupled to the engagement cover fastening part, wherein a first side of the engagement cover includes a cover member receiving part, which is for receiving the cover member and the wiper blade assembly further includes a fastening protrusion, which is located in a predetermined region of the cover member receiving part.

The fastening protrusion includes a plate portion, which forms a body, a first end of the plate portion is connected to the cover member receiving part, and the entire plate portion except for the first end is separated from the cover member receiving part.

The fastening protrusion further includes a protruding portion, which is located in a predetermined region on a second side of the plate portion and is coupled to a fastening groove that is located in a predetermined region on a side of the elastic member.

The fastening protrusion further includes a pressing portion, which extends from a second end of the plate portion.

The cover member receiving part includes a first supporting portion, which is for supporting the cover member, and a second supporting portion, which is a predetermined distance apart from the first supporting portion.

The wiper blade assembly further includes an adapter, which is attached to or detached from a receiving part of the engagement cover, wherein a predetermined region of the top surface of the fastening protrusion and a predetermined region of the bottom of the adapter are placed in contact.

The cover member further includes an elastic member insertion part, wherein the elastic member is inserted into the elastic member insertion part of the cover member with the engagement cover coupled to the engagement cover fastening part of the cover member.

Advantageous Effects

According to exemplary embodiments of the present invention, since a refill member and a cover member can be fabricated by a single process using extrusion molding, the number of manufacturing processes can be reduced.

In addition, since the protruding portion is located in the fastening groove, the movement of the engagement cover in its longitudinal direction can be prevented. When the protruding portion is inserted into the fastening groove, the protruding portion and the fastening groove can be easily coupled by pressing the pressing portion.

BRIEF DESCRIPTION OF DRAWINGS

FIG. 1 is a coupled perspective view illustrating a wiper blade assembly according to the present invention, and FIG. 2 is an exploded perspective view illustrating the wiper blade assembly according to the present invention.

FIGS. 3 through 5 are perspective views illustrating how an engagement cover and an adapter of the wiper blade assembly according to the present invention are coupled.

FIG. 6 is a perspective view illustrating an adapter of the wiper blade assembly according to the present invention, FIG. 7 is a perspective view illustrating the engagement cover of the wiper blade assembly according to the present invention, and FIG. 8 is a perspective view illustrating a state in which the engagement cover and the adapter of the wiper blade assembly according to the present invention are separated.

FIGS. 9 through 11 are perspective views illustrating how a fastening protrusion and an elastic member of the wiper blade assembly are coupled.

FIG. 12 is another perspective view illustrating the wiper blade assembly according to the present invention.

BEST MODES FOR CARRYING OUT THE INVENTION

Advantages and features of the present disclosure and methods of accomplishing the same may be understood more readily by reference to the following detailed description of exemplary embodiments and the accompanying drawings. The present disclosure may, however, be embodied in many different forms and should not be construed as being limited to the exemplary embodiments set forth herein. Rather, these exemplary embodiments are provided so that this disclosure will be thorough and complete and will fully convey the concept of the present disclosure to those skilled in the art, and the present disclosure will only be defined within the scope of the appended claims.

Reference will now be made in detail to exemplary embodiments of the present invention, examples of which are illustrated in the accompanying drawings. In the drawings, like reference numerals indicate like elements. As used herein, the term "and/or" includes any and all combinations of one or more of the associated listed items.

Although the terms "first, second, and so forth" are used to describe diverse constituent elements, such constituent elements are not limited by the terms. The terms are used only to discriminate a constituent element from other constituent elements. Accordingly, in the following description, a first constituent element may be a second constituent element.

The terminology used herein is for the purpose of describing particular embodiments only and is not intended to be limiting. As used herein, the singular forms "a," "an," and "the" are intended to include the plural forms, including "at least one," unless the content clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Furthermore, relative terms such as "below," "beneath," or "lower," "above," and "upper" may be used herein to describe one element's relationship to another element as illustrated in the accompanying drawings. It will be understood that relative terms are intended to encompass different orientations of the device in addition to the orientation depicted in the accompanying drawings. For example, if the device in the accompanying drawings is turned over, elements described as being on the "lower" side of other elements would then be oriented on "upper" sides of the other elements. Similarly, if the device in one of the figures is turned over, elements described as "below" or "beneath" other elements would then be oriented "above" the other elements. Therefore, the exemplary terms "below" and "beneath," when used to describe a particular element's spatial relationship to another element, can encompass orientations of that element both above and below another element, depending on the orientation of the device.

Exemplary embodiments of the present invention will hereinafter be described with reference to the accompanying drawings.

FIG. 1 is a coupled perspective view illustrating a wiper blade assembly according to the present invention, and FIG. 2 is an exploded perspective view illustrating the wiper blade assembly according to the present invention.

Referring to FIGS. 1 and 2, a wiper blade assembly 100 includes a refill member 600, which is formed of a rubber material and is attached on a wind shield of a vehicle, an elastic member 700, which supports the refill member 600, and a cover member 500 (500a and 500b) into which the elastic member 700 is inserted, and further includes an engagement cover 200, which is located in a predetermined region in a longitudinal direction of the wiper blade assembly 100 and includes a receiving part.

The wiper blade assembly 100 further includes an adapter 300, which is attached to, or detached from, the receiving part of the engagement cover 200, and the adapter 300 may be coupled to a connector 400, which may be of various types.

Although not specifically illustrated, a wiper arm may be coupled to the connector 400 so that the wiper blade assembly can be wiped by a driving force delivered from the wiper arm.

The engagement cover is illustrated as being located in a central region in the longitudinal direction of the wiper blade assembly. Alternatively, the engagement cover may be disposed in another central region or a peripheral region as necessary. The location of the engagement cover is not particularly limited.

Referring further to FIGS. 1 and 2, the refill member 600 and the cover member 500 of the wiper blade assembly 100 may be formed in one integral body. More specifically, the refill member and the cover member may be formed in one integral body by an extrusion molding method. Thus, the refill member and the cover member may be formed of the same material.

However, the material of the cover member is not particularly limited. That is, alternatively, the refill member and the cover member may be formed of different materials.

In a case in which the refill member and the cover member are formed of different materials, the refill member and the cover member may be formed by dual extrusion molding.

That is, since the refill member and the cover member are formed in one integral body, the refill member and the cover member may be considered as a single element. Also, since the refill member and the cover member are fabricated by a single process using extrusion molding, the number of manufacturing processes can be reduced.

As illustrated in FIG. 2, the cover member 500 includes an elastic member insertion part 510 into which the elastic member is inserted.

That is, by inserting the elastic member 700 into the elastic member insertion part 510, the elastic member 700 and the cover member 500 may be coupled together.

The cover member 500 further includes an engagement cover fastening part 520, and by coupling the engagement cover 200 to the engagement cover fastening part 520, the engagement cover may be fixed to the cover member.

As described above, the cover member may be formed of the same material as the refill member, such as, for example, a rubber material.

In this case, the cover member formed of a rubber material may be weak in rigidity, and thus, it may be difficult to firmly fix the engagement cover.

Accordingly, the elastic member 700 may be inserted into the elastic member insertion part 510 with the engagement cover 200 coupled to the engagement cover fastening part 520, in which case, the elastic member is supported by the engagement cover 200 so as to firmly fix the engagement cover and the cover member.

The same effect of firmly fixing the engagement cover and the cover member may also be achieved in a case in which the engagement cover and the cover member are formed of different materials.

It will be described later how the engagement cover, the elastic member, and the cover member are coupled to one another.

Referring further to FIG. 2, the elastic member 700 includes a fastening groove 710, which is located in a predetermined region on a side of the elastic member 700, and the fastening groove 710 may prevent the movement of the engagement cover 200 in its longitudinal direction by being coupled to a fastening protrusion (not illustrated), which is located in a predetermined region of the engagement cover 200 and will be described later.

The cover member 500 includes a groove 521, which is located in a predetermined region on a side of the engagement cover fastening part 520 to correspond to the fastening groove 710, and the groove 521 may be provided not to interfere with the movement of the fastening protrusion and the coupling of the fastening protrusion to the fastening groove.

MODES FOR CARRYING OUT THE INVENTION

It will hereinafter be described how the engagement cover 200 and the adapter 300 are coupled.

FIGS. 3 through 2D are perspective views illustrating how the engagement cover and the adapter of the wiper blade assembly according to the present invention are coupled.

More specifically, FIG. 3 is a perspective view illustrating how the engagement cover and the adapter are coupled, FIG. 4 is a perspective view illustrating an operating state of the wiper blade assembly according to the present invention for separating the engagement cover and the adapter, and FIG. 5 is a perspective view illustrating a state in which the engagement cover and the adapter are separated.

Referring to FIGS. 3 through 5, the engagement cover 200 includes a body part 210 and an adapter receiving part 215, which is located in a predetermined region of the body part 210. That is, the adapter receiving part may accommodate the adapter therein and may thus be coupled to the adapter.

A first fastening part 230 is provided on one side of the adapter receiving part 215, and a third fastening part 250 is provided on the other side of the adapter receiving part 215.

The first fastening part 230 includes a first projecting portion 231, which extends in a height direction Z of the engagement cover, and a second projecting portion 232, which extends in a longitudinal direction Y of the engagement cover.

A first end of the first projecting portion 231 extends from a predetermined portion of the adapter receiving part 215, and a second end of the first projecting portion 231 extends to the second projecting portion 232.

The second projecting portion 232 includes a locking protrusion 234, which extends to a predetermined length, and a protrusion 233, which extends in the same direction as the locking protrusion 234 to a length longer than the length of the locking protrusion 234.

The third fastening part 250 may be implemented as a fastening groove or hole, and thus, the adapter may be coupled through the first fastening part 230 and the third fastening part 250 of the receiving groove. This will be described later.

Referring further to FIGS. 3 through 5, the engagement cover 200 of the wiper blade assembly according to the present invention includes an auxiliary body part 240, which is located in a predetermined direction of the body part, particularly, the direction in which the protrusion 233 extends, and the auxiliary body part 240 includes a horizontal auxiliary body 241 and a vertical auxiliary body 242, which protrudes in a width direction X of the auxiliary body part 240. This will be described later.

The adapter 300 of the wiper blade assembly according to the present invention includes a body part 320, and a connector receiving part 310 is provided in a predetermined region of the body part 320. A connecting pin 311 is provided on the inside of the connector receiving part 310. That is, the adaptor receiving part 310 of the adapter 300 may receive, and may thus be coupled to, the connector 400 of FIG. 2. This is obvious to a person skilled in the art, and thus, a detailed description thereof will be omitted.

The adapter 300 includes a second fastening part 330, which is disposed on one side of the body part 320, and a fourth fastening part (not illustrated), which is disposed on the other side of the body part 320.

The second fastening part 330 includes a pressing structure, and the pressing structure includes a first pressing portion 331, a connecting portion 332, and a second pressing portion 333.

More specifically, the pressing structure includes the first and second pressing portions 331 and 333, which extend from one side of the body part 320, and the connecting portion 332, which connects the first and second pressing portions 331 and 333.

The connecting portion 332 includes a first connecting portion 332a, which is connected to the first pressing portion 331, and a second connecting portion 332b, which is connected to the second pressing portion 333, and a pressing point 332c, which is located in a region where the first and second connection portions 332a and 332b contact each other.

One side of the first pressing portion 331 includes a first connecting point 331a, which is connected to one side of the body part 320, and a second connecting point 331b, which is connected to the first connecting portion 332a, and one side of the second pressing portion 333 includes a third connecting point 333a, which is connected to one side of the body part 320, and a fourth connecting point 333b, which is connected to the second connecting portion 332b.

That is, in the pressing structure, the first pressing portion 331, the connecting portion 332, and the second pressing portion 333 are connected to one another to form an "M" shape, and one side of the first pressing portion and one side of the second pressing portion are connected to the body part.

Referring further to FIGS. 3 through 5, the second fastening part 330 of the adapter 300 of the wiper blade assembly according to the present invention includes a fastening structure, which is disposed on the inside of the pressing structure and is a predetermined distance apart from the pressing structure.

The fastening structure includes a first supporting part 334 and a second supporter 335, which is a predetermined distance apart from the first supporting part 334.

A first fastening groove 337 and a second fastening groove 336, which extends from the first fastening groove 337, are formed by the distance between the first and second supporting parts 334 and 335.

More specifically, the first supporting part 334 includes a longitudinal first support 334a, which extends in the longitudinal direction Y of the adapter 300, and a widthwise second support 334b, which extends in the width direction X of the adapter 300, and the second supporting part 335 includes a longitudinal second support 335a, which extends in the longitudinal direction Y of the adapter 300, and a widthwise second support 335b, which extends in the width direction X of the adapter 300.

The first fastening groove 337 may be formed by the distance between the longitudinal first support 334a and the longitudinal second support 335a, and the second fastening groove 336 may be formed by the distance between the widthwise first support 334b and the widthwise second support 335b.

It will hereinafter be described how the engagement cover 200 and the adapter 300 can be coupled to each other and can be separated from each other.

FIG. 3 illustrates a state in which the engagement cover and the adapter are coupled. Referring to FIGS. 3 through 5, the fourth fastening part (340 of FIG. 6) of the adapter 300 is coupled to the third fastening part 250 of FIG. 5, and then, the second fastening part 330 of the adapter 300 and the first fastening part 230 of the engagement cover 200 are coupled.

In response to the second fastening part 330 of the adapter 300 and the first fastening part 230 of the engagement cover 200 being coupled, the second projecting portion 232, which extends in the longitudinal direction Y of the engagement cover, is positioned in the first fastening groove 337, which is formed by the distance between the first and second supporting parts 334 and 335, and the second fastening groove 336, which extends from the first fastening groove 337.

More specifically, the second projecting portion 232 includes the locking protrusion 234, which extends to a predetermined length, and the protrusion 233, which extends in the same direction as the locking protrusion 234 and extends to a length longer than the length of the locking protrusion 234.

The first supporting part 334 includes the longitudinal first support 334a, which extends in the longitudinal direction Y of the adapter 300, and the widthwise second support 334b, which extends in the width direction X of the adapter 300, and the second supporting part 335 includes the longitudinal second support 335a, which extends in the longitudinal direction Y of the adapter 300, and the widthwise second support 335b, which extends in the width direction X of the adapter 300.

The first fastening groove 337 may be formed by the distance between the longitudinal first support 334a and the longitudinal second support 335a, and the second fastening groove 336 may be formed by the distance between the widthwise first support 334b and the widthwise second support 335b.

In this case, the locking protrusion 234 may be positioned in the first fastening groove 337, and the protrusion 233 may be positioned in the second fastening groove 336.

The locking protrusion 234 engages with the widthwise first support 334b and the widthwise second support 335b to prevent the second fastening part 330 of the adapter 300 from being separated from the first fastening part 230 of the engagement cover 200.

FIG. 4 illustrates an operating state for separating the adapter from the engagement cover, and the adapter may be separated from the engagement cover through the pressing structure of the second fastening part 330 of the adapter 300.

More specifically, the pressing structure includes the first and second pressing portions 331 and 333, which extend from one side of the body part 320, and the connecting portion 332, which connects the first and second pressing portions 331 and 333.

One side of the first pressing portion 331 includes the first connecting point 331a, which is connected to one side of the body part 320, and the second connecting point 331b, which is connected to the first connecting portion 332a, and one side of the second pressing portion 333 includes the third connecting point 333a, which is connected to one side of the body part 320, and the fourth connecting point 333b, which is connected to the second connecting portion 332b.

The first and third connecting points 331a and 333a are connected to the body part and thus suggest reference points while being in a fixed state. In response to a user pressing the second and fourth connecting points 331b and 333b in a width direction, the pressing point 332c in the region where the first and second connecting portions 332a and 332b contact each other moves in its longitudinal direction (i.e., the opposite direction of the direction Y of FIG. 4).

The pressing point 332c presses the protrusion 233 of the adapter 300 in its longitudinal direction (i.e., the opposite direction of the direction Y of FIG. 4) and thus also presses the locking protrusion 234 in its longitudinal direction (i.e., the opposite direction of the direction Y of FIG. 4). As a result, the locking protrusion 234 that engages with the widthwise first support 334b and the widthwise second support 335b is detached from the widthwise first support 334b and the widthwise second support 335b, and thus, the second fastening part 330 of the adapter 300 is separated from the first fastening part 230 of the engagement cover 200.

Thereafter, the fourth fastening part (340 of FIG. 6) of the adapter 300 is separated from the third fastening part 250 of the engagement cover. Then, finally, the engagement cover and the adapter are separated, as illustrated in FIG. 5.

Referring to FIG. 5, the engagement cover 200 includes a fastening protrusion 220, which is located in a predetermined region of the adapter receiving part 215.

As described above, the fastening protrusion 220 is coupled to the fastening groove (710 of FIG. 2), which is located in a predetermined region on a side of the elastic member 700, and may thus prevent the movement of the engagement cover 200 in its longitudinal direction.

As illustrated in FIG. 5, one side of the fastening protrusion 220 is connected to the adaptor receiving part, and the rest of the fastening protrusion 220 is separated from the adapter receiving part.

Thus, the fastening protrusion and the adapter receiving part are connected via a first side of the fastening protrusion connected to the adapter receiving part, and the entire fastening protrusion except for the first side connected to the adapter receiving part is spaced the from the adapter receiving part.

The top surface of the fastening protrusion 220 is flat, and the bottom surface of the fastening protrusion 220 includes a protruding portion (not illustrated) and a pressing portion (not illustrated). This will be described later.

According to the present invention, a structure for coupling the engagement cover and the adapter and a structure for separating the engagement cover and the adapter are separately provided, and thus, the adapter can be easily separated from the engagement cover.

Also, since the pressing portion provided on a side of the adapter can be pressed from a side of the engagement cover, rather than from the top surface of the engagement cover, without affecting other parts, the adapter can be easily separated from the engagement cover.

As described above, the engagement cover 200 of the wiper blade assembly according to the present invention includes the auxiliary body part 240, which is positioned in the predetermined direction of the body part, particularly, the direction in which the protrusion 233 extends, and the auxiliary body part 240 includes the horizontal auxiliary body 241 and the vertical auxiliary body 242, which protrudes in the width direction X of the auxiliary body part 240.

As already mentioned above, since an element capable of separating the adapter from a side of the adapter can be pressed from a side of the engagement cover, rather than from the top surface of the engagement cover, without affecting other parts, the adapter can be easily separated from the engagement cover.

For this reason, however, the element capable of separating the adapter, located on a side of the adapter, may be accidentally pressed, and as a result, the adapter and the engagement cover may be accidentally separated from each other.

Therefore, in the present invention, the height to which the vertical auxiliary body portion 242 protrudes in the width direction X of the auxiliary body part 240 is set to be equal to, or greater than, the height of the surfaces of the first and second pressing portions 331 and 333 the protruding height of the first pressing portion 331 and the second pressing portion 333. Thus, it is possible to prevent the first and second pressing portions from being accidentally pressed.

FIG. 6 is a perspective view illustrating, in a different direction, an adapter of the wiper blade assembly according to the present invention, FIG. 7 is a perspective view illustrating, in a different direction, the engagement cover of the wiper blade assembly according to the present invention, and FIG. 8 is a perspective view illustrating, in a different direction, a state in which the engagement cover and the adapter of the wiper blade assembly according to the present invention are separated.

Referring to FIG. 6, the adapter 300 includes the second fastening part 330 second fastening part 330, which is disposed on one side of the body part 320, and the fourth fastening part 340, which is disposed on the other side of the body part 320.

The fourth fastening part 340 may be formed as a supporting protrusion, and the supporting protrusion may be inserted into the fastening groove or the fastening hole of the third fastening part 250 of FIG. 5 such that the other side of the adapter and the other side of the engagement cover may be coupled.

Referring to FIG. 7, a cover member receiving part 260, which is for receiving the cover member 500, is formed on the bottom surface of the engagement cover 200.

That is, as described above, the cover member 500 includes the engagement cover fastening part 520, and the engagement cover 200 is coupled to the engagement cover fastening part 520 such that the engagement cover may be coupled to the cover member.

Since the engagement coupling cover 200 is coupled to the engagement cover coupling part 520, a predetermined region of the cover member 500 is received in the receiving part 260 such that the engagement cover and the cover member may be fixed.

The receiving part 260 of the engagement cover 200 includes a first supporting part 261, which is for supporting the cover member 500, and a second supporting part 261, which is a predetermined distance apart from the first supporting part 261. For example, the receiving part 260 may be supported by inserting a side of the cover member into a space 264, which is located between the second supporting portion 262 and the bottom surface of the cover member receiving part 260.

In the meantime, as described above, the engagement cover according to the present invention includes the adapter receiving part and the cover member receiving part.

That is, the adapter receiving part, which is for receiving the adapter, is provided on the top surface of the engagement cover, and the cover member receiving part, which is for receiving the cover member, is provided on the bottom surface of the engagement cover.

The top surface of the engagement cover may be defined as a first side of the engagement cover, and the bottom surface of the engagement cover may be defined as a second side may be defined as the second side of the engagement cover, and the bottom surface of the engagement cover may be defined as the first side of the engagement cover. The meanings of the terms "top surface" and "bottom surface", as used herein, are not particularly limited.

Referring to FIG. 5, the fastening protrusion 220 is provided in a predetermined region of the adapter receiving part. Referring to FIG. 7, the fastening protrusion 220 is provided in a predetermined region of the cover member receiving part.

For clarity, the top surface of the fastening protrusion 220 may be defined as being located in a predetermined region of the adapter receiving part, and the bottom surface of the fastening protrusion 220 may be defined as being located in a predetermined region of the cover member receiving part. The top surface of the engagement cover may be defined as the first side of the engagement cover, and the bottom surface of the engagement cover may be defined as the second side of the engagement cover. However, the meanings of the terms "top surface" and "bottom surface", as used herein, are not particularly limited.

That is, referring to FIG. 7, the engagement cover 200 includes the fastening protrusion 220, which is located in a predetermined region of the cover member receiving part 260, and the bottom surface of the fastening protrusion 220 is located in the cover member receiving part 260.

As illustrated in FIG. 7, one side of the fastening protrusion 220 is connected to the cover member receiving part, and the rest of the fastening protrusion 220 is separated from the cover member receiving part. This is as already described above with reference to FIG. 5.

More specifically, the bottom surface of the fastening protrusion 220 includes a plate portion 221, which forms a body. That is, the fastening protrusion is connected to the cover member receiving part through a first end of the plate portion.

The bottom surface of the fastening protrusion 220 further includes a protruding portion 223, which is located in a predetermined region on the other side of the plate portion 221. The protruding portion 223 is coupled to the fastening groove (710 of FIG. 2), which is located in a predetermined region on a side of the elastic member 700, and may thus prevent the movement of the engagement cover 200 in its longitudinal direction.

The bottom surface of the fastening protrusion 220 further includes a pressing portion 222, which extends from a second end of the plate portion 221.

As described above, the fastening protrusion is connected to the adapter receiving part or the cover member receiving part through the first side of the fastening protrusion connected to the adapter receiving part or the cover member receiving part, and the entire fastening protrusion except for the first side connected to the adapter receiving part or the cover member receiving part is spaced apart from the adapter receiving part or the cover member receiving part.

In this case, by pressing the pressing portion 222, which is located at the bottom surface of the fastening protrusion, the entire fastening protrusion except for the first side connected to the adapter receiving part or the cover member receiving part can be spaced apart from the adapter receiving part or the cover member receiving part.

As described above, by pressing the pressing portion 222, which is located at the bottom surface of the fastening protrusion, the entire fastening protrusion except for the first side connected to the adapter receiving part or the cover member receiving part can be spaced apart from the adapter receiving part or the cover member receiving part.

For this reason, however, the pressing portion may be accidentally pressed, and as a result, the entire fastening protrusion except for the first side connected to the adapter receiving part or the cover member receiving part may be spaced apart from the adapter receiving part or the cover member receiving part.

That is, in the case of using the wiper blade assembly according to the present invention, in response to the pressing portion being accidentally pressed, the elastic member may be accidentally separated from the engagement cover.

Accordingly, referring to FIG. 8, a predetermined region (a hatched region) at the top surface of the fastening protrusion 220 and a predetermined region 351 (a hatched region) at a bottom 350 of the adapter may be placed in contact with each other.

That is, the predetermined region 351 at the bottom 350 of the adapter may serve as a stopper for the predetermined region at the top surface of the fastening protrusion 220 and may thus prevent the pressing portion from being pressed when the adapter 300 and the engagement cover 200 are coupled.

The coupling between the fastening protrusion and the elastic member will hereinafter be described.

FIGS. 9 through 11 are perspective views illustrating how a fastening protrusion and an elastic member of the wiper blade assembly are coupled. For convenience, the cover member of FIG. 2 is not illustrated in FIGS. 9 through 11.

That is, as described above, in the wiper blade assembly according to the present invention, the elastic member 700 is inserted into the elastic member insertion part 510 with the engagement cover 200 coupled to the engagement cover fastening part 520 of the cover member 500.

The cover member is not particularly illustrated in FIGS. 9 through 11, but it may be understood, from FIGS. 9 through 11, that the engagement cover 200 is coupled to the cover member fastening part 520 of the cover member 500.

Referring to FIG. 9, the elastic member 700 is inserted into the elastic member insertion part (not illustrated) of the cover member (not illustrated) with the engagement cover 200 coupled to the engagement cover fastening part (not illustrated) of the cover member.

As illustrated in FIG. 9, a first end of the elastic member that is inserted is blocked by the protruding portion 223 of the fastening protrusion 220 and thus cannot be inserted any further.

Accordingly, referring to FIG. 10, the pressing portion 222, which extends from the second end of the plate portion 221, may be pressed in a direction indicated by an arrow, thereby preventing the first end of the elastic member from being blocked by the protruding portion 222. As a result, the elastic member may continue to be inserted.

Referring to FIG. 11, the elastic member 700 continues to be inserted until the fastening groove 710 of the elastic member is placed in a region corresponding to the protruding portion 223. Thereafter, the force applied to the pressing portion 222 is removed. Then, the protruding portion 223 is placed in the fastening groove 710.

In this manner, the fastening protrusion and the elastic member may be coupled.

According to the present invention, since the protruding portion 223 is located in the fastening groove 710, the movement of the engagement cover in its longitudinal direction can be prevented.

When the protruding portion is inserted into the fastening groove, the protruding portion and the fastening groove can be easily coupled by pressing the pressing portion.

FIG. 12 is another perspective view illustrating the wiper blade assembly according to the present invention.

As illustrated in FIG. 12, the cover member receiving part of the engagement cover 200 includes the first supporting part 261, which is for supporting the cover member 500, and the second supporting part 261, which is a predetermined distance apart from the first supporting part 261. For example, the cover member receiving part may be supported by inserting a side of the cover member into the space 264, which is located between the second supporting portion 262 and the bottom surface of the cover member receiving part 260.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A wiper blade assembly, comprising:
   a refill member;
   an elastic member which supports the refill member;
   a cover member into which the elastic member is inserted, the cover member including an engagement cover fastening part; and an engagement cover which is coupled to the engagement cover fastening part, wherein a first side of the engagement cover includes a cover member receiving part, which is for receiving the cover member, the wiper blade assembly further includes a fastening protrusion, which is located in a predetermined region of the cover member receiving part, wherein a portion of the fastening protrusion is inserted into the elastic member to prevent the elastic member from moving longitudinally, the wiper blade assembly further includes an adapter being attached to and detached from the engagement cover, wherein a top surface of the fastening protrusion makes contact with a bottom of the adapter when the adapter is engaged with the engagement cover in such a way that the bottom of the adapter functions as a stopper for preventing the fastening protrusion from being detached from the elastic member.

2. The wiper blade assembly of claim 1, wherein the fastening protrusion includes a plate portion, which forms a body, a first end of the plate portion is connected to the cover member receiving part, and the entire plate portion except for the first end is separated from the cover member receiving part.

3. The wiper blade assembly of claim 2, wherein the fastening protrusion further includes a protruding portion, which is located in a predetermined region on a second side of the plate portion and is coupled to a fastening groove that is located in a predetermined region on a side of the elastic member.

4. The wiper blade assembly of claim 3, wherein the fastening protrusion further includes a pressing portion, which extends from a second end of the plate portion.

5. The wiper blade assembly of claim 1, wherein the cover member receiving part includes a first supporting portion, which is for supporting the cover member, and a second supporting portion, which is a predetermined distance apart from the first supporting portion.

6. The wiper blade assembly of claim 1, further comprising:

an adapter receiving part, which is provided on a second side of the engagement cover and is for receiving the adapter.

7. The wiper blade assembly of claim 1, wherein the cover member further includes an elastic member insertion part, wherein the elastic member is inserted into the elastic member insertion part of the cover member with the engagement cover coupled to the engagement cover fastening part of the cover member.

* * * * *